Feb. 4, 1930.  S. S. RATHBUN  1,745,953
POWER TRANSMITTING MECHANISM
Filed June 7, 1927  3 Sheets-Sheet 2
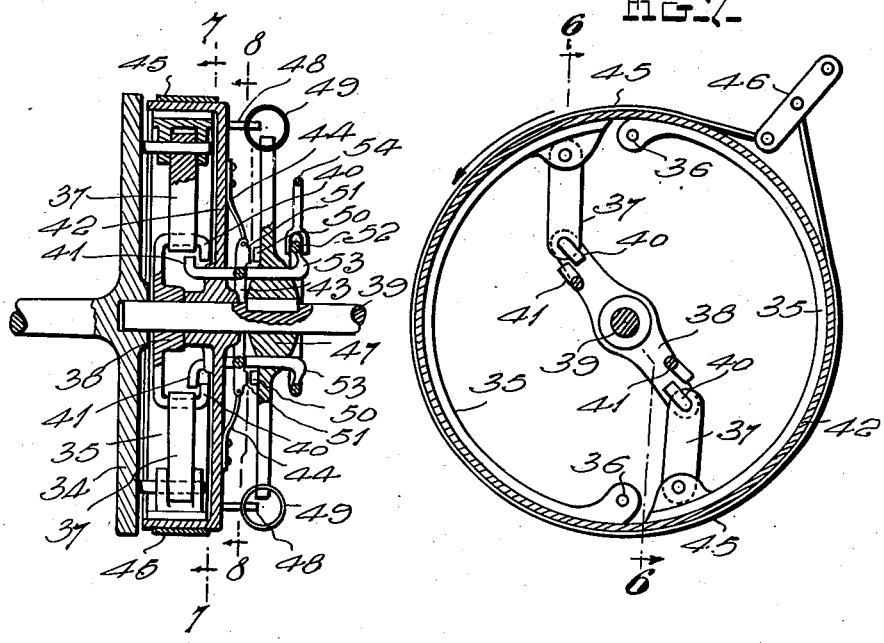
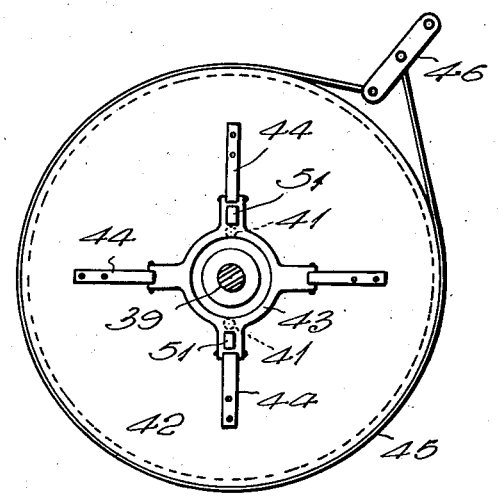
INVENTOR
SHERRILL S. RATHBUN
BY
Gordon & Stewart
ATTORNEYS

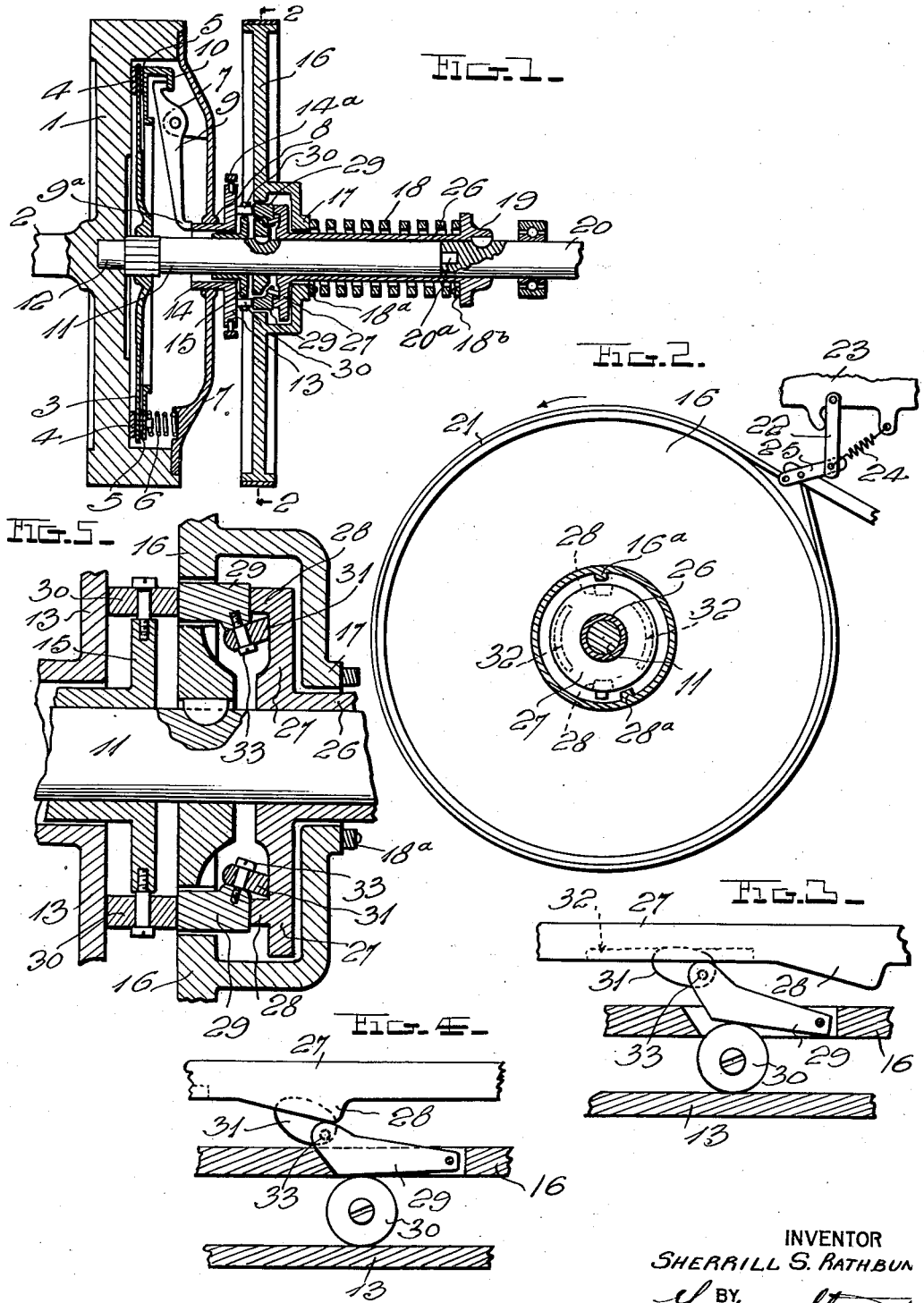

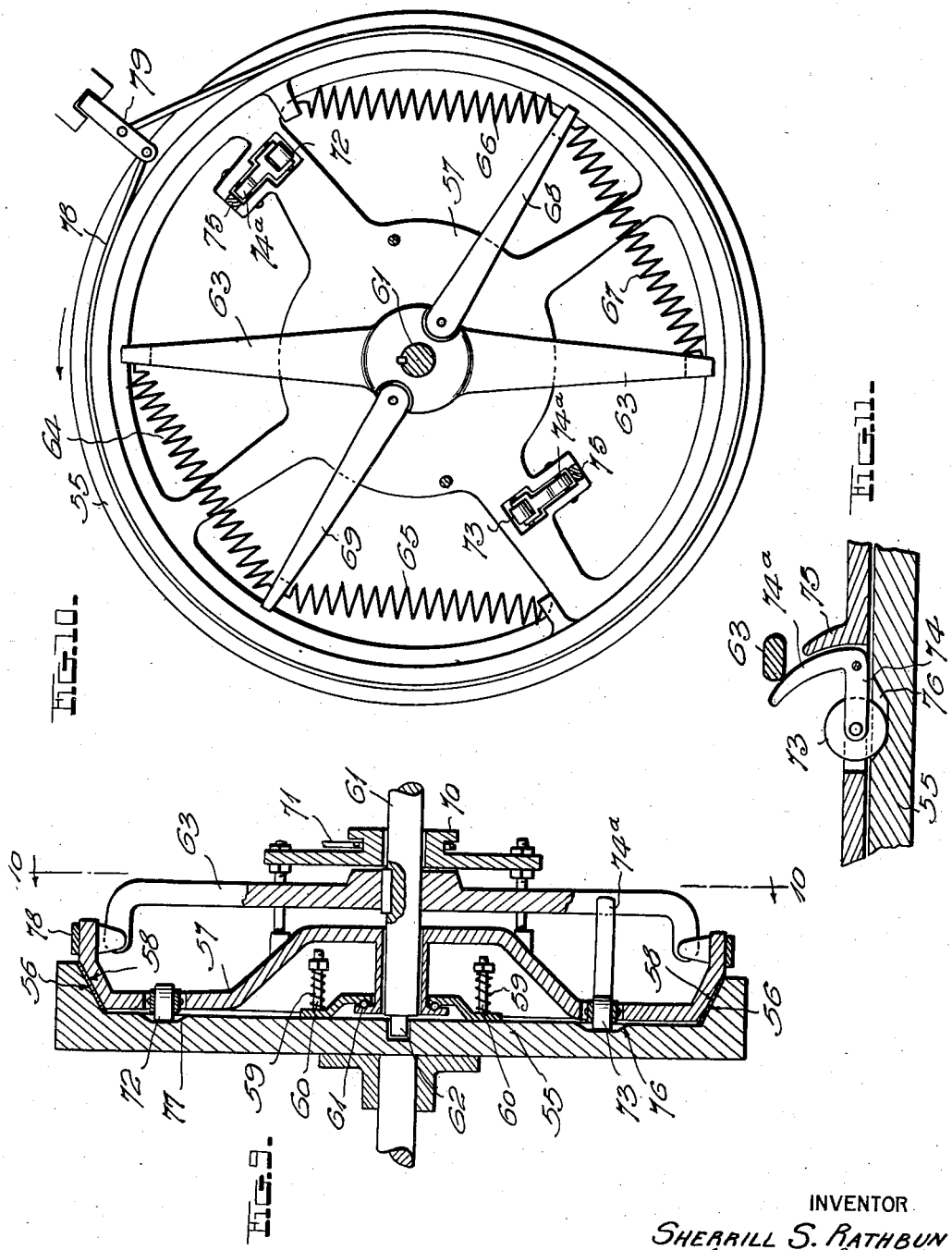

Patented Feb. 4, 1930

1,745,953

UNITED STATES PATENT OFFICE

SHERRILL S. RATHBUN, OF ROCKVILLE CENTER, NEW YORK

POWER-TRANSMITTING MECHANISM

Application filed June 7, 1927. Serial No. 197,026.

The present invention relates to a form of power transmitting mechanism involving more especially the transmission of power from a prime mover to a mechanism such as the rear axle of an automotive vehicle.

It is a well known fact that in the transmission of power from the power plant of an automotive vehicle to the rear axle, there exists the necessity for applying a relatively high torque at low speeds to the rear axle or the driven member. It is particularly necessary at the starting of the vehicle from rest and also in hill climbing. At other times such as when the vehicle is proceeding at normal speed along a level highway the relatively high torque is not necessary but a higher speed is desirable. In order to fulfill these two conditions and at the same time provide an engine or prime mover of convenient and economical size it becomes essential to provide or insert between the driving member i. e. the engine; and the driven member i. e. the rear axle, a torque multiplying mechanism and a clutch such as is found in the usual multi-speed transmission commonly known as a gear shift or transmission. Such a mechanism provides for a change in the ratio of angular rotation between the driving member and the driven member and in this manner provides a mechanism which will readily give a suitable torque multiplication between the driving and the driven member.

It is the purpose of applicant's present invention to provide a mechanism which will readily give a suitable torque multiplication between driving and driven members and which will function automatically in accordance with the torque demand of the driven member.

More specifically the present invention has reference to a type of a gearless torque transmission and multiplying mechanism involving the use of a kinetic energy device in conjunction with a clutch or disconnecting device between the driving mechanism and the driven mechanism.

It is an object of the present invention to provide a mechanism of the class described in which torque may be multiplied and transmitted without the use of gearing.

It is a further object of the present invention to provide a mechanism without gearing in which the ratio of torque present in the driving and the driven members varies inversely as the ratio of their average angular velocities.

It is a further object of the present invention to provide a device which automatically causes the driving and the driven members to automatically become directly connected when the angular velocity of the driven member approaches that of the driving member.

It is a still further object of the present invention to provide a device of the character described one element of which functions as a brake.

Referring now to the drawings which disclose several embodiments of applicant's invention, Fig. 1 shows a cross sectional view of one form of torque transmitting mechanism;

Fig. 2 is a view partially in section along the line 2—2 of Fig. 1;

Fig. 3 is an enlarged sectional view of a detail;

Fig. 4 is an enlarged sectional view similar to Fig. 3 but showing the parts in a relatively different position;

Fig. 5 is an enlarged sectional view of a portion of the structure shown in Fig. 1;

Fig. 6 is a cross sectional view of a second modification, said section being taken approximately along the section line 6—6, Fig. 7.

Fig. 7 is an end view partially in section taken along the line 7—7 of Fig. 6;

Fig. 8 is a view taken along the line 8—8 of Fig. 6;

Fig. 9 is a sectional view of another modification

Fig. 10 is a view partially in section along the line 10—10 of Fig. 9;

Fig. 11 is an enlarged sectional view of a detail of the structure shown in Fig. 10.

The embodiment disclosed in Fig. 1 comprises a driving member 1 capable of accumulating kinetic energy this member being rotated by means of shaft 2. The driving member 1 may be preferably the fly-wheel of the internal combustion engine which functions to produce the necessary power. Mounted within the member 1 is a single plate clutch member of the conventional type comprising a clutch plate 3 the outer annular surface of which is engaged by friction surfaces 4 and 5 normally urged together by means of a plurality of springs 6 which springs 6 are carried by a spider 7, the inner ends of which spider are in turn carried by a hub member 8. A plurality of disengaging levers 9 are pivotally mounted on the spider frame 7 in such a manner that when their inner ends 9ª are pressed inwardly or to the left their outer ends engage a member 10 in such a manner as to separate the frictional annular surfaces 4 and 5 and thereby release the clutch plate 3. This clutch plate 3 is splined to a shaft 11 the inner end or left hand end of which is rotatably centered in a depression 12 in the center of the flywheel. It will therefore be evident that with the clutch surfaces engaged the shaft 11 will partake of the rotation of shaft 2, and member 1.

The inner ends 9ª of the clutch engaging levers are moved to the left by means of a clutch throw-out collar 13 which has portions 14 projecting through hub portion 8 and in contact with the inner ends 9ª of levers 9. This clutch collar 13 may be moved to the left either by a clutch throw-out yoke member 14ª or by means of a member 15 slidable and rotatable on shaft 11. The actuation of member 15 is accomplished in a manner to be later described.

The shaft 11 has keyed thereon a drum member 16 which drum has integral therewith a part 17 to which end 18ª of a helical resilient member 18 is fastened. The outer end 18ᵇ of the helical member is fixed or keyed to the driven shaft 20 by means of a member 19, shaft 20 being mounted for relative rotation with respect to shaft 11 which is centered therein by a projection 20ª. It will therefore be seen that when shaft 11 is rotated the drum 16 will be accordingly rotated and will store up torque in the resilient member 18 until the torque is sufficient to rotate the shaft 20 with its load when shaft 20 will also partake of rotary motion.

As is shown in Fig. 2 a frictional band brake 21 is applied to the exterior of the drum 16 the same being held in position by means of a lever 22 pivoted to a fixed portion of the vehicle 23 and normally urged away from the drum by means of a resilient member 24. The brake band 21 is fixed to a second lever 25 pivoted to lever 22 in such a manner that when the drum 16 rotates counter-clockwise or in the direction shown by the arrow in Fig. 2 the same rotates freely, but if the drum 16 tends to rotate in the reverse direction, the band 21 will tighten about drum 16 and lock the same against clockwise rotation. The band 21 with its mountings therefore functions as a ratchet or one way rotation device permitting the drum 16 to rotate only in a counterclockwise direction. It will therefore be seen that any energy stored up in the resilient member 18 by rotation of the drum or member 16 must be expended in an application of counterclockwise torque to the driven shaft 20.

Member 19 has affixed thereto a sleeve 26 which rotatably surrounds member 11 and which carries at its inner end a hub member or portion 27 which member has two diametrically opposite projecting lugs 28 extending beyond the plane surface of the hub. Two openings are provided in the drum member 16 the same radial distance from the center of rotation as the projections 28 and fingers 29 are pivoted in these openings. These fingers are so located on the drum member 16 with reference to the projecting lugs 28 on the disk 27 that they can normally assume a position within the plane defined by the face of the drum member 16, this position being that as shown in Fig. 3. When spring 18 is sufficiently tensioned, however, the projections or cams 28 assume a position opposite the ends of the fingers 29 and the front faces of the fingers will be forced outwardly even with the normal plane surface of the drum 16 into a position indicated in Fig. 4. This will only occur when the drum 16 and its shaft 11 is rotated a considerable angular distance relative to the shaft 20 thereby exerting a heavy torque on the helical member 18.

A cam 31 is pivoted to the inner edge of each finger by means of a pin 33. These cams function in a manner to be later described, and as these cams are not essential to the device in its broader aspects, the functioning of the structure can be more readily explained by ignoring these cams for the present.

The member 15 previously referred to as operative to release the clutch when moved towards the left has rollers 30, 30 which rollers are also the same radial distance from the center of rotation as the fingers 29. When the fingers 29 lie in their normal position within the finger recesses in the plate in the drum 16 it will be seen that when the rollers 30 relatively rotate to a position in which they register with the finger slots of drum 16, they will drop therein as shown in Fig. 3 thereby causing or permitting the clutch members to become engaged so that rotational effort is transmitted from the shaft 2 to shaft 11. This rotational effort will continue to be applied to the shaft 11 with consequent rotation of drum 16 and the application of torque to the resilient member 18. If the load on the driven shaft 20 is heavy, torque will continue to be applied to the member 18 until the drum is rotated relative to member 27 and to a position in which the inner ends of the fingers 29 ride up on the projections 28 of member 27. This will cause the fingers to press against rollers 30 and to actuate the clutch mechanism so that the clutch is released. The driving member 1 then moves relative to the clutch member which is held by the ratchet or one way rotational band 21 and the resilient member 18 which is now under tension transmits its torque to the driven member 20 causing the same to revolve. At the same time the flywheel or driving member 1 is now running free and is storing up kinetic energy by virtue of its mass. The relative rotation thus produced between the driven shaft 20 and the associated member 27 and the shaft 11 with its associated member 16 causes the cam surfaces 28 to again move away from the inner ends of the fingers 29 thereby permitting the fingers 29 to drop back to the position shown in Fig. 3. When the driven member therefore rotates relative to drum 16 sufficiently to bring the rollers 30 on the end of member 15 again into register with the finger slots of the drum 16 the clutch member will again become engaged and a second torque impulse given to the resilient member 18 by virtue of the kinetic energy of the driving member. As the application of torque to the member 18 may take place through a small degree of angular rotation and as the multiplication of torque depends upon the relative average angular velocities of the flywheel or driving member 1 and the driven member 20, it will be seen that a relatively larger amount of torque can be applied to the resilient member 18.

As the member 20 begins to rotate as in the starting of the vehicle, the demand of the driven member 20 for torque made upon a resilient member 18 will gradually become less. This will cause the clutch member to be periodically engaged for a relative greater period as the relative angular rotation between the member 27 and drum 16 will be greater before the cam portions 28 cooperate with the inner ends of the fingers 27 to disengage the clutch. It will be therefore seen that the torque impulses which are first given to the resilient member 18 from the driving member 1 are of relatively short duration but of great intensity or of high torque. As the vehicle gets under way the angular duration of the impulses becomes relatively greater until finally the torque demand of the driven member upon the resilient member 18 decreases to a value which is such that the cam member 28 cannot be deflected or moved relatively to the finger openings in the drum 16 a sufficient amount to deflect the fingers to the clutch throw-out position. When this occurs the clutch will not become disengaged and there will then exist a direct connection or drive from the driving member 1 through shaft 11, drum 16, spring 18 to the driven member 20.

If however the torque demand of the driven member 20 at any time exceeds a predetermined amount, as for instance when the vehicle begins to ascend a grade, the drum 16 will rotate a sufficient amount to cause the fingers 29 to be thrown out by the cam members 28. This will automatically throw out the clutch and will permit the engine to speed up and again make use of the kinetic energy or mass velocity effect of the flywheel to supply a multiplied torque proportionate to the relative average angular velocities of the driving member and driven member during the periods when the extra demand for torque is made.

In instances where the maximum torque of the engine is not sufficient to twist the resilient member sufficiently to cause fingers 29 and cam members 28 to function in the manner described, the kinetic action may be initiated by momentarily manually disengaging the clutch.

Reference is now had to the cams 31 the function of which will now be explained.

In the use of the device described in cases where the driven member 20 is rotating very slowly, as when the vehicle is being started, the deflection of the resilient member 18 will decrease but a small amount between the impulses or clutch engagement which will engage twice for each relative revolution of the driving member 1 with respect to the drum 16 and associated shaft 11. To prevent the wear on the clutch surfaces occasioned by this frequent engagement and disengagement of the clutch under these conditions the cams 31 mounted on the rear end of fingers 29 as shown in Figs. 4 and 5 prevent the fingers from being depressed until the deflection of the spring or resilient member 18 has decreased so that the cams 31 will drop into the grooves 32. Before this decrease in deflection has occurred the driving member may turn several revolutions. The cams 31 are of such a shape and formation that they will roll or cam to the position shown in Fig. 5 when the deflection decreases even though they are not in this position when the clutch is released. The cams 31 are mounted on a pivoted shaft or member 33 which is located at an angle or inclination so that centrifugal force will aid in keeping the cams in constant contact with the member 27 which is connected with the driven member.

Stops 16$^a$ and 28$^a$ are provided on members 16 and 28 so that when the driven member may become the driving member as in coasting, torque is transmitted to member 16 without stress and the one way rotational band 21 may be used as a brake.

In the modification shown in Figs. 6, 7 and 8 the torque transmitting structure is shown in connection with a friction clutch of the drum type. In this embodiment the driving member 34 carries a plurality of friction segments 35 which are attached to the driving member by the pins 36 at one end and are attached at their other end to links 37, 37 which are in turn carried by a loose collar or member 38 which is free to rotate on the driven shaft 39. The pins to which the links 37 are attached have projecting pieces 40 which are adapted to normally strike against projections 41 which are slidably fitted through bores in the hub of the clutch member 42. These slidable members 41 are rigidly fixed to a clutch actuating ring 43 which is normally urged to an outward position by springs 44, 44, 44, 44, the outer position being such that the ends of the members 41 normally engage the projections 40 in such a manner as to expand the friction shoes carried by the driving member 34 against the clutch member 42 thereby causing rotational effort to be transmitted from the driving member 34 to the clutch member 42. When however the clutch operating ring 43 is moved inwardly against the tension of the springs 44 and into the position shown in Fig. 6 the ends of the members 41 will function to release the projections 40 and cause the friction surfaces to become disengaged. The outer circumference of the clutch member 42 is provided with a friction band 45 which has its ends pivotally connected to a lever 46 so that one way rotation is provided for the clutch member 42 which rotation is in the direction indicated by the arrow in Fig. 7. This is due to the fact that rotation in the opposite direction will cause the band 45 to tighten around the circumference of the clutch member 42 and lock it against clockwise rotation.

The clutch member 42 which is free to rotate with respect to the driven shaft or member 39 is connected to drive this shaft through the medium of a spider member 47 suitably fixed or keyed to shaft 39, the outer ends of the spider being resiliently connected to a plurality of pins 48 fixed near the outer circumference of the clutch member 42 this connection being provided by means of a plurality of springs or resilient members 49. By virtue of these resilient members 49 it will be seen that when the clutch member 42 is rotated through clutch connection with the driving member 34 the resilient members 49 will be placed in tension and cause torque to be transmitted from the clutch member 42 which is only capable of one way rotation, to the driven shaft 39.

Automatic means for operating the clutch throw-out ring 43 and thereby disengaging the clutch is provided by the projections 50 which are integral and located diametrically opposite each other. These projections are adapted to cooperate with two diametrically opposite cam members 51, 51 mounted or fixed to the clutch throwout ring 43 which cam members when they come opposite the projections 50, 50 are forced inwardly, thus moving the projections 41, 41 out of register with the clutch locking members 40, 40 and thereby releasing the clutch. It is of course to be understood that the projections 50, 50 are angularly positioned with respect to the cams 51, 51 in such a manner that the clutch disconnection will not take place until the maximum amount of energy has been stored in the resilient members 49. That is to say, a maximum deflection or extension of the members 49 is necessary in order to bring the cams 51, 51 into an operating position with reference to the projections 50, 50.

For manual operation of the clutch mechanism a second clutch throw-out ring 52 is provided which has a plurality of projections 53, 53 passing through the hub of the spider member 47 and bearing against the first clutch throwout ring 43. This second clutch throw-out ring member is operated by a shifting fork 54 which is connected to the conventional form of control device. Therefore when it is desired to manually disconnect the driven member from the driving member the clutch throw-out member 54 is operated.

The operation of this modification is much the same as that that has been previously described. That is to say considering the driven member to be at rest and the driving member operating, the clutch is first permitted to engage by proper manipulation of the clutch control mechanism. Thereupon rotary motion will be transmitted to the clutch drum 42 placing the resilient members 49 under tension and thereby tending to transmit torque to the driven member 39. As long as the torque is of a sufficiently high value to cause the resilient members 49 to elongate a sufficient amount, the clutch will be alternately engaged and disengaged by the functioning of the cam members 51 and the co-related projections 50 thereby causing an intermittent transmission of energy from the driven member to the resilient members with a consequent multiplication of torque due to the mass-velocity effect of the driving member 34 during this periodical engagement and disengagement. As the member 39 increases in speed its torque demand will become less and the periods of clutch engagement will therefore be relatively longer with respect to the periods of disengagement. As the decrease in torque demand continues, a condition will be reached where there will not be sufficient torque to elongate the resilient members 49 sufficiently for relative rotation to cause the clutch throw-out cams 51 to ride upon the actuating projections 50, so that the clutch will remain in continuous engagement and a direct drive between the driving member 34 and the driven member 39 will result.

A still further embodiment of the present invention is disclosed in Figs. 9, 10 and 11. In this form a friction clutch of the cone type is employed. In the modification shown in these figures a driving member 55 is provided with an internal clutch engaging surface 56. A clutch member 57 is mounted adjacent the driving member 55 and carries an annular friction surface 58 adapted to cooperate with the engaging surfaces 56 of the driving member 55. These surfaces are normally held in contact by means of a plurality of clutch engaging springs 59 mounted on studs 60 carried by the driving member 55 and functioning through a thrust bearing 61 to urge the clutch member 57 against the driving member 55. The driven member 61 which comprises a shaft connected to the rear axle of the vehicle or similar load to be driven, has its front end rotatably centered in a recess 62 in the center of the driving member 55. It should of course be understood that the connection of member 61 to the rear axle may incorporate a reverse gear for backing. A two-armed spider 63 is keyed or otherwise fixed to the driven member 61. The arms of this spider are connected to the clutch member 57 by means of a plurality of resilient members or springs 64, 65, 66 and 67. Supplemental pivoted arms 68 and 69 support the connection between resilient members 64 and 65 and resilient members 66 and 67 so that the pull of the springs will be along the circumference of the device. The clutch member 57 is manually engaged and disengaged by means of a sliding clutch throw-out collars 70 which is actuated by a manual control lever 71. The automatic means for disengaging the clutch comprises two diametrically opposite rollers 72 and 73. As shown in Fig. 11 these rollers are carried by an L-shaped arm 74 the rear projecting limb 74ᵃ of which contacts with an upstanding or rearward projection 75 on the clutch member so that while the roller 73 is free to move or swing toward the driving member it is withheld from moving up or back from the plane of the clutch member. This will be seen by reference to Fig. 11.

The portion 74ᵃ of the roller supporting levers is extended back for some distance and is adapted during certain periods of operation to come in contact with one of the spider arms 63 in a manner to be later described. The rollers 72 and 73 which are located at different distances from the axis of rotation of the clutch member are adapted to register with a pair of arcuate slots or recesses 76 and 77 formed in the inner surface of the driving member 55. Whenever the rollers 72 and 73 register or lie within these arcuate recesses it will be noted that the clutch member 57 is in frictional engagement with the driving member 55 and thereby partakes of its rotation, this of course taking place if the manual control lever 71 is in a proper position for this to happen.

A one-way rotational device is applied to the clutch member 57 the same comprising a brake band 78 located around the outer surface of the clutch member 57. This brake band is connected to a lever 79 in such a manner as to permit counter-clockwise rotation of the clutch member but not to permit clockwise rotation in the manner hereinbefore described.

The operation of the device is similar to those embodiments which have been previously described. When the clutch member 57 is released manually it will become engaged with the driving member 55 as soon as the rollers 72 and 73 register or drop into the corresponding arcuate slots 76 and 77. This engagement will thereby cause the clutch member 57 to rotate and will place the resilient members 64, 65, 66, and 67 under tension thereby causing them to deliver their torque to the driven member 61 through the medium of the spider arms. When the torque demand on the springs increases to a certain amount the driving member 55 and clutch member 57 will be rotated a sufficient angular distance to cause the tail ends of the roller carrying levers to contact against the spider arms as shown in Fig. 11, thereby urging the rollers against the inner surface of the driving member 55 and causing the clutch to become disengaged. After such disengagement the driving member will rotate an entire relative revolution with respect to the clutch member 57 before re-engagement as the rollers 72 and 73 and the corresponding coacting depressions 76, 77 are placed at different radial distances from the center of rotation. As has already been described in connection with the previous embodiment the clutch will therefore alternately engage and disengage until the demand for torque reduces to an amount where the relative movement between the clutch member 57 and the spider member 63 will not be sufficient to cause the tail ends of the roller supporting levers to cam the clutch member 57 out of engagement with the driving member 55. A direct drive will therefore result.

With this type of clutch and modification just described it will be noted that considerable torque may be transmitted through the rollers 73 and 72 due to their location in the depressions and their co-action with the slanting surface at the end of the depression. This is particularly true when the rollers are located at a relatively large distance from the axis of the shaft. If desired the structure may be so constructed as to take advantage of this feature and thereby the wear on the friction or clutch surfaces could be considerably reduced. In certain instances the entire torque can be transmitted by means of the rollers and the friction surfaces would not be necessary.

While the present structure has been disclosed and illustrated in connection with the plate type of clutch, a drum type of clutch, and a cone type of clutch it is of course to be understood that it is equally applicable to various other forms of clutch structure.

It should of course be understood that the present invention may find utilization with other structures than automotive vehicles, the same being applicable wherever power is to be applied to a load under variable torque conditions.

It is also to be understood that various modifications of the structure may be made without departing from the spirit of the invention and the scope of the appended claims.

What I claim is:

1. In a device of the class described, a driving member, a driven member, energy storing means between said driving and said driven member, including a resilient member, a rotatable member, means to prevent reverse rotation thereof, a friction clutch adapted to periodically connect said rotatable member with said driving means, and automatic clutch controlling means associated with said energy storing means, and responsive to the amount of energy therein.

2. In a device of the class described, a driving member, a driven member, energy storing means between said driving and said driven member, including a resilient member, a rotatable member and a frictional device adapted to prevent backward rotation of said rotatable member, a friction clutch adapted to periodically connect said rotatable member with said driving means, and automatic clutch controlling means associated with said energy storing means, and responsive to the amount of energy therein.

3. In a device of the class described, a driving member, a driven member, energy storing means between said driving and said driven member, including a member rotatable relative to said driving member, a spring connected between said rotatable member, and said driven member, and a brake band adapted to prevent backward rotation of said rotatable member, but to allow forward rotation of the same, a clutch adapted to connect said rotatable member with said driving means, and clutch controlling means associated with said energy storing means, and responsive to the amount of distortion of said spring, including fingers adapted to allow said clutch to engage when a relatively small amount of distortion exists in said spring, and to cause said clutch to be disengaged when a relatively large amount of distortion is present therein, substantialy as described.

4. In a power transmitting mechanism, the combination of a driving member, a driven member, a rotatable member, an energy storing means comprising a resilient member having one end connected to said driven member to deliver torque thereto, the other end being connected to the rotatable member, a plurality of clutch controlling fingers mounted in said rotatable member, clutch mechanism for connecting said driving member to said rotatable member and a plurality of cams directly connected to said driven member and functioning to operate said fingers to disconnect said clutch from said driving member upon a relative predetermined rotation between said rotatable member and said driven member.

In testimony whereof, I have subscribed my name.

SHERRILL S. RATHBUN.